(12) United States Patent
Sumiya et al.

(10) Patent No.: US 7,780,106 B2
(45) Date of Patent: Aug. 24, 2010

(54) RECORDING TAPE CARTRIDGE

(75) Inventors: Yosuke Sumiya, Kanagawa (JP); Yasushi Hatano, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/379,981

(22) Filed: Mar. 5, 2009

(65) Prior Publication Data
US 2009/0225472 A1 Sep. 10, 2009

(30) Foreign Application Priority Data
Mar. 10, 2008 (JP) .............................. 2008-060057

(51) Int. Cl.
G11B 23/107 (2006.01)
G11B 23/08 (2006.01)

(52) U.S. Cl. ...................... 242/348; 360/132

(58) Field of Classification Search ................ 242/348, 242/347, 347.1, 348.1, 348.2, 348.3; 360/132
See application file for complete search history.

(56) References Cited

U.S. PATENT DOCUMENTS

| 6,452,745 | B1 * | 9/2002 | Shiga et al. | 360/132 |
| 6,481,658 | B1 * | 11/2002 | Shiga et al. | 242/347 |
| 6,702,215 | B2 * | 3/2004 | Stamm et al. | 242/348 |
| 6,959,889 | B2 * | 11/2005 | Hiraguchi | 242/348 |
| 6,986,479 | B2 * | 1/2006 | Iino | 242/348 |
| 7,064,926 | B2 * | 6/2006 | Kitamura et al. | 360/132 |
| 7,114,672 | B2 * | 10/2006 | Hiraguchi | 242/348 |
| 2003/0002214 | A1 * | 1/2003 | Kitamura et al. | 360/132 |
| 2004/0124300 | A1 * | 7/2004 | Hiraguchi | 242/348 |
| 2005/0040272 | A1 * | 2/2005 | Argumedo et al. | 242/348 |
| 2009/0225472 | A1 * | 9/2009 | Sumiya et al. | 360/134 |

FOREIGN PATENT DOCUMENTS
JP 2001202745 7/2001

* cited by examiner

*Primary Examiner*—Evan H Langdon
(74) *Attorney, Agent, or Firm*—Jean C. Edwards, Esq.; Akerman Senterfitt

(57) ABSTRACT

The present invention provides a recording tape cartridge with a retention structure capable of stabilizing and retaining a memory board without deformation of the memory board. A recording tape cartridge includes a case for accommodating a reel on which recording tape is wound, the case formed by an upper case and a lower case and a non-contact memory board, on which various information is stored and which is disposed at a specific angle within the case. The lower case is formed with a position control member of substantially a C-shape in plan view for controlling the position of the memory board, and a support member for supporting the bottom face of the memory board at substantially the central portion thereof. The upper case is formed with retaining members that face portions of the top face of the memory board at both ends in the memory board length direction.

7 Claims, 7 Drawing Sheets

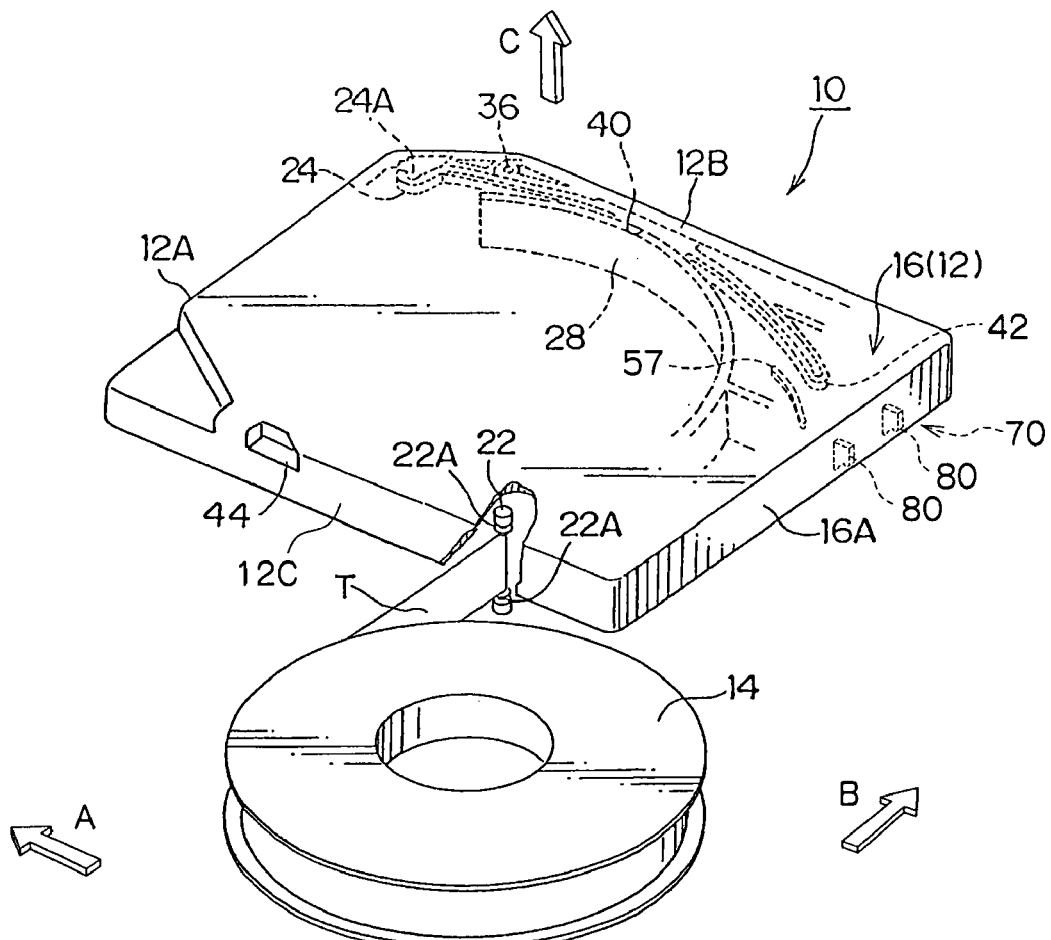
Figure 2
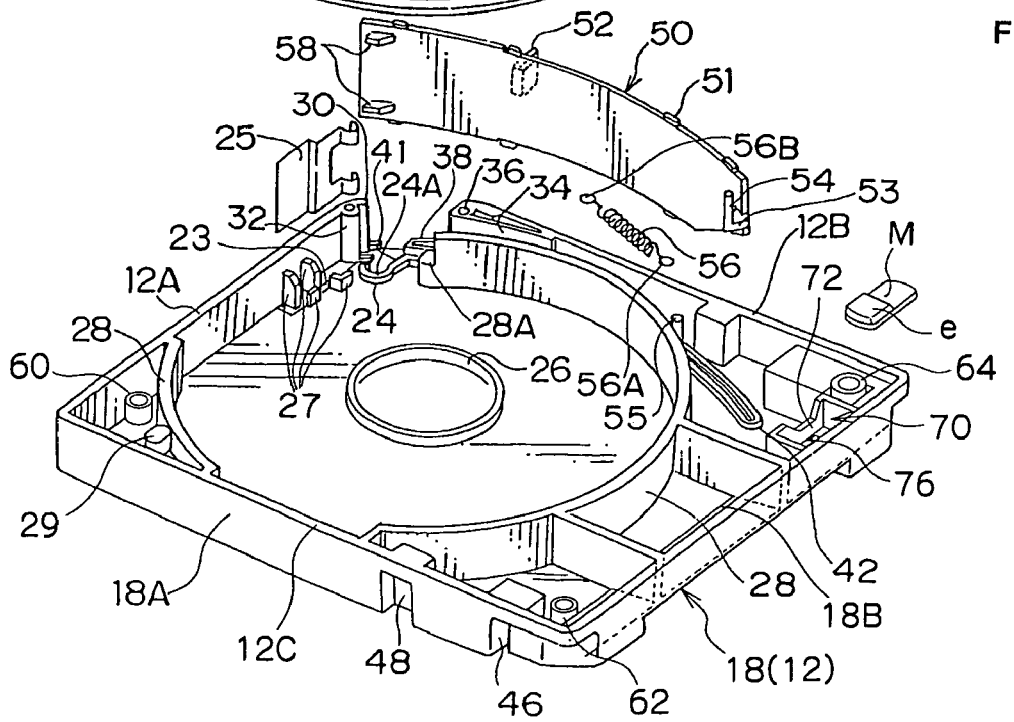

RECORDING TAPE CARTRIDGE

CROSS-REFERENCE TO RELATED APPLICATION

This application claims priority under 35 USC 119 from Japanese Patent Application No. 2008-060057, the disclosure of which is incorporated by reference herein.

BACKGROUND

1. Technical Field

The present invention relates to a recording tape cartridge for accommodating a recording tape, such as recording tape used as a recording/reproduction medium mainly on computers and the like, within a case.

2. Related Art

Recording tape cartridges are known for winding recording tape, such as magnetic tape of the like used as a data recording/reproducing medium (data backup) of computers and the like, onto a synthetic resin reel, and accommodating the recording tape on a single of these reels within a case. Sometimes such recording tape cartridges are installed with a non-contact memory board, on which various information has been stored, such as the recording capacity and recording format.

These memory boards are configured to be accessible (readable-writable) by means of electromagnetic waves, and the memory boards are disposed at a specific angle (for example 45°) in the case, so to be compatible with accessing the various information stored on the memory board with a library device from the rear face of the case, and compatible with accessing from the bottom face of the case with a drive device (please refer to Japanese Patent Publication No. 2001-202745).

SUMMARY

In order to dispose memory boards at a specific angle in this manner within the case, the case needs to be configured with retention structures for retaining the memory board at the specific angle. However, there is a possibility that the retention structures described in Japanese Patent Publication No. 2001-202745 deform (cause damage to) the memory board since they retain the memory board by pressing thereon. Namely, there is room to improve the memory board retention structure.

An objective of the present invention is to provide a recording tape cartridge with a retention structure capable of stabilizing and retaining a memory board without deformation of the memory board.

In order to attain the above objective the recording tape cartridge according to the present invention includes a case for accommodating a reel on which recording tape is wound, the case including an upper case and a lower case; a non-contact memory board, on which various information is stored and which is disposed at a specific angle within the case. The lower case includes a position control member of substantially a C-shape in plan view, for controlling the position of the memory board, and the upper case includes a retaining member that faces portions of the top face of the memory board at both ends in the memory board length direction.

BRIEF DESCRIPTION OF THE DRAWINGS

Exemplary embodiments of the present invention will be described in detail based on the following drawings, wherein:

FIG. 2 is a schematic exploded perspective view of a recording tape cartridge;

DETAILED DESCRIPTION

Figure 1:
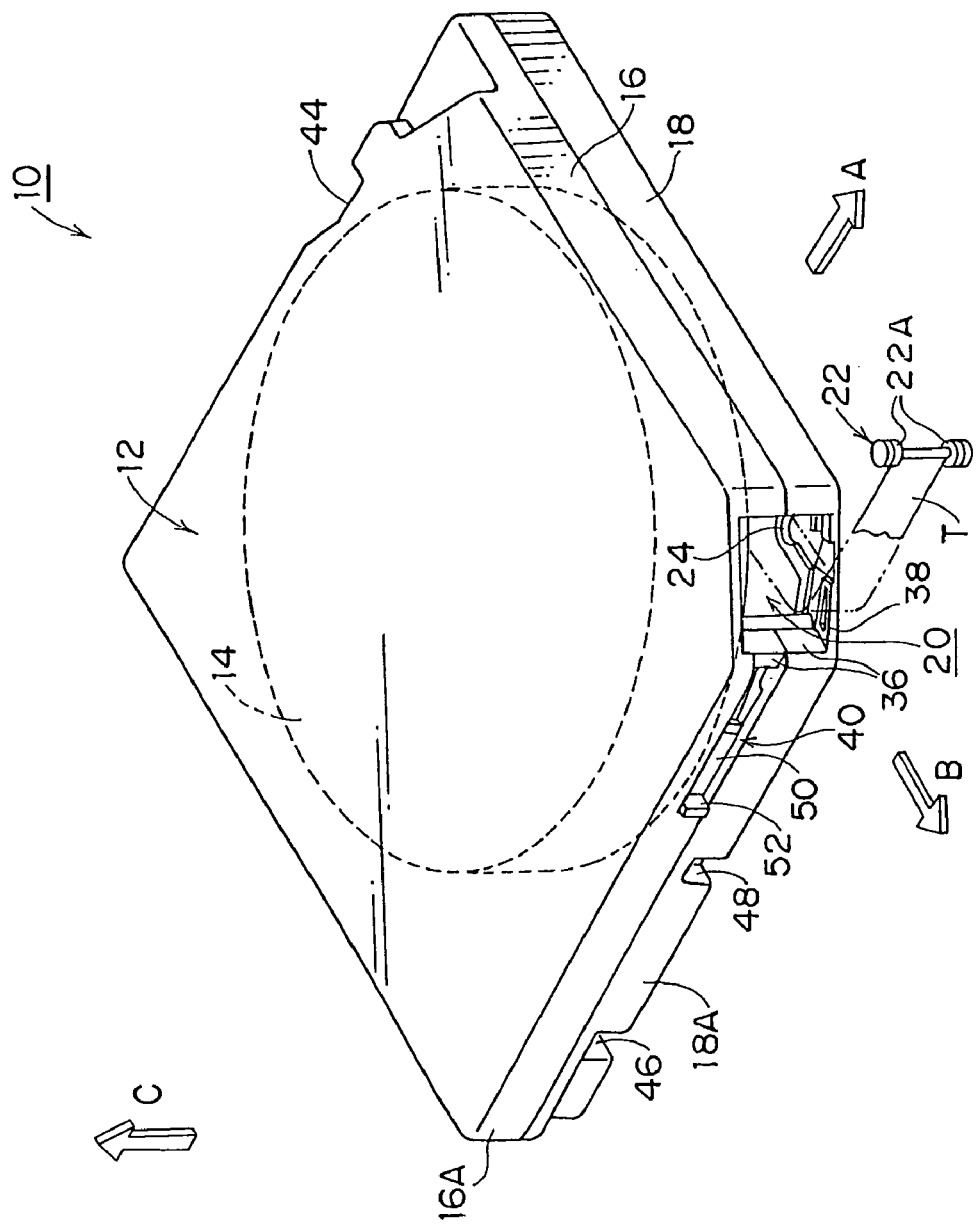
FIG. 1 is a schematic perspective view of a recording tape cartridge.
Figure 3:
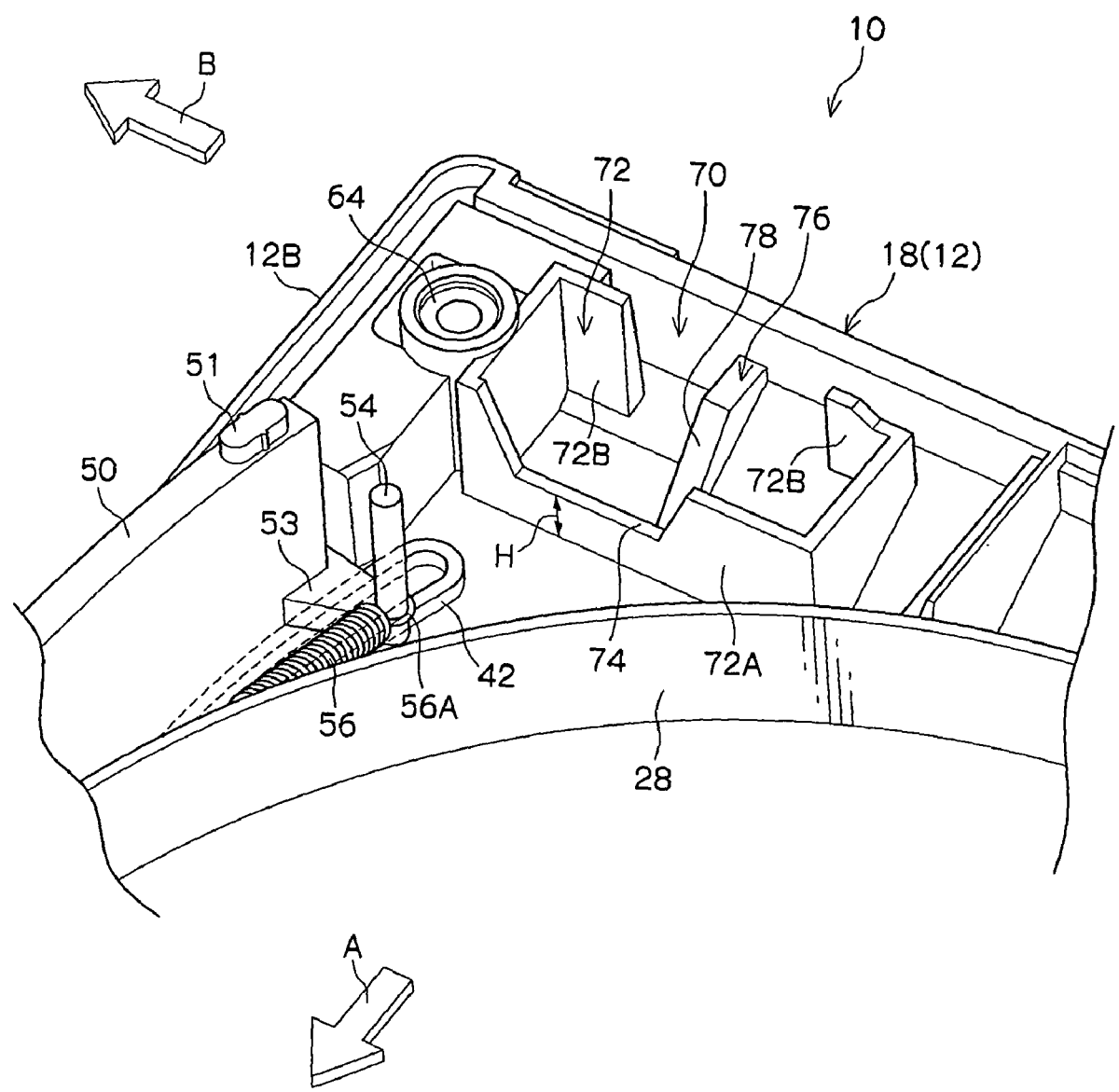
FIG. 3 is a schematic perspective view showing a memory board retention structure at a lower case side.

Explanation will now be given of details of an embodiment of the best mode of the present invention, based on an embodiment shown in the drawings. For ease of explanation, in FIG. 1, the direction of loading the recording tape cartridge 10 into a drive device (not shown in the drawings) is shown by the arrow A, and this is designated as the front direction (front side) of the recording tape cartridge 10. The direction shown by the arrow B, orthogonal to the direction of arrow A, is designated as the right direction (right side). The direction shown by arrow C, orthogonal to both the direction of arrow A and the direction of arrow B, is designated at the up direction (top side) of the recording tape cartridge 10.

As shown in FIGS. 1 and 2, the recording tape cartridge 10 is configured with a substantially rectangular shaped case 12 in plan view, within which is accommodated a single rotatable reel 14 wound with recording tape T, an information recording/reproduction medium such as a magnetic tape or the like. The case 12 is configured with an upper case 16 and a lower case 18, both with the right front corner, one of the corners at the leading edge toward the drive device, cut-away at an angle. The upper case 16 and the lower case 18 are joined together by matching up and joining together peripheral walls 16A and 18A thereof. There is an internal space configured inside the upper case 16 and the lower case 18 to accommodate the reel 14.

The cut-away corner of the peripheral walls 16A, 18A of the upper case 16 and the lower case 18 forms an opening 20 for pulling out the recording tape T therefrom. There is a leader pin 22 connected to the free end of the recording tape T that is pulled out from the opening 20, operation being by pull-out means of the drive device latching to (engaging with) and pulling out the leader pin 22. Ring shaped grooves 22A are formed around both ends of the leader pin 22, which protrude out further than the end portions of the recording tape T in the width direction, and the ring shaped grooves 22A are latched by a hook or the like of the pulling out means. Configuration is thus made such that when the recording tape T is pulled out there is no contact with or damage to the recording tape T, such as by the hook.

A pair of pin retaining portions 24, upper and lower, are provided at the inside of the opening 20 of the case 12 for positioning and retaining the leader pin 22 within the case 12. The pin retaining portions 24 are formed in a substantially semi-circular cylindrical shape, such that the two end portions of the upright leader pin 22 are retained within recess portions 24A of the pin retaining portions 24. The outer peripheral wall of the pin retaining portions 24 is open to the recording tape T pull-out side, forming an exit-entry port for the leader pin 22 to exit from, and enter into.

A plate spring 25 is disposed in the vicinity of the pin retaining portions 24, the base of the plate spring 25 being inserted and fixed into spring retention portions 27 and a grooved portion 23 provided on the inside face of a front wall 12A (the portion of the peripheral walls 16A, 18A whose external face faces in the direction of arrow A). The leading end portions of the two forks of the plate spring 25 engage with the upper and lower ends of the leader pin 22 and retain the leader pin 22 in the pin retaining portions 24. The leading ends of the plate spring 25 undergo appropriate elastic deformation when the leader pin 22 exits or enters the pin retaining portions 24, such that movement of the leader pin 22 is permitted.

A gear opening 26 is also provided in the central portion of the lower case 18, in order to externally expose a reel gear (not shown in the drawings) of the reel 14, such that the reel 14 is rotated within the case 12 by meshing the reel gear of the reel 14 with a drive gear of the drive device (not shown in the drawings). The reel 14 is accommodated within loosely restricting walls 28 protruding out locally from the internal faces of the upper case 16 and the lower case lower case 18, provided as a circular shaped track coaxial to the gear opening 26, such that the reel 14 is retained without rattling around.

An envelope portion 28A is formed continuous to the end portion of the loosely restricting walls 28 in the vicinity of the opening 20, the envelope portion 28A being formed internally with a hole for position control. An envelope portion 29 is provided at the inside of the left-front corner of the case 12, with a separation between the envelope portion 29 and the loosely restricting walls 28. The envelope portion 29 is formed with a long hole used for position control. The envelope portions 28A, 29 are disposed along a straight line in the direction of arrow B, and the periphery of the holes for position control on the bottom face (portions the same size as the thickness of the walls of the envelope portions 28A, 29 or slightly wider portions) act as reference faces for positioning with respect to the drive device. Each of the edges of the loosely restricting walls 28 are provided continuous to the peripheral walls 16A and 18A of the case 12, except for at the end portions of the loosely restricting walls 28 connected to the envelope portion 28A, thereby sectioning off the outside of the loosely restricting walls 28 from the accommodation space for the reel 14.

A pair of screw bosses 60, upper and lower, is provided at a specific location between the front wall 12A at the side of the envelope portion 29 and the loosely restricting wall 28. Pairs of screw bosses 62, 64, upper and lower, are also respectively provided at specific locations in both corner portions between the left and right ends respectively of a rear internal wall 18B of the lower case 18, and left wall 12C and right wall 12B. These pairs of screw bosses 60, 62, 64 are formed so as to pierce through at the lower case 18 side but not to pierce through at the upper case 16 side.

A pair of short angled wall portions 30, upper and lower, is provided at the right end of the front wall 12A of the case 12, defining the front edge portion of the opening 20. The angled wall portions 30 are formed so as to curve along the open face of the opening 20, and the leading end of a later described door 50 which is formed in a substantially circular arced shape in plan view intrudes inside the angled wall portions 30 when the opening 20 is closed off, forming a dust prevention barrier such that there is no gap formed into which dust or the like could permeate. A pair of screw bosses 32, upper and lower, is provided continuous with the inside of the front wall 12A in the vicinity of the angled wall portions 30.

A pair of angled wall portions 34, upper and lower, is formed at the inside of the front end portion of a right wall 12B of the case 12 (the portion of the peripheral walls 16A and 18A whose outside faces in the direction of arrow B), the angled wall portions 34 being formed substantially along the outer peripheral face of the later described door 50 when seen in plan view. The front end faces of the angled wall portions 34 define the rear edge of the opening 20, and there is a pair of screw bosses 36, upper and lower, provided at these front end portions.

A slit 40 is provided of a specific length in the right wall 12B of the case 12 as a window portion, communicating the inside and the outside of the case 12 and used for exposing an operation protrusion 52 of the door 50, described later. The slit 40 is formed as a cut out at a lower portion on the front side of the peripheral wall 16A of the upper case 16 configuring the right wall 12B, and the slit 40 is also open to the opening 20 side. The slit 40 is preferably formed in this manner so as to leave a portion of the peripheral wall 16A remaining on the upper side of the slit 40, enabling rigidity of the case 12 to be maintained. The wall defining the top side of the slit 40 is more preferably provided continuous and integrally to the angled wall portion 34.

Recessed portion 48 is formed at the back side of the lower case 18, recessed except for at a portion at the top end of the peripheral wall peripheral wall 18A, the recessed portion 48 being recessed toward the inside of the case 12 in substantially an inverted U-shape when viewed in cross-section (the bottom plate is cut out). The recessed portion 48 acts, for example, as engaging portions to be engaged by pulling-in means of the drive device, with the bottom faces of the recessed portion 48 (the face thereof that faces downward) acting as reference faces for positioning within the drive device.

There is also a recessed portion 46 formed at the rear of the recessed portion 48, at the back side of the lower case 18, recessed except for at a portion at the top end of the peripheral wall peripheral wall 18A, the recessed portion 46 being recessed toward the inside of the case 12 in substantially an inverted U-shape when viewed in cross-section (the bottom plate is cut out). The recessed portion 46 acts as an engaging portion to be engaged by gripping means of the library device (not shown in the drawings), such that the twisting rigidity of the case 12 (the lower case 18) is increased by the provision of the recessed portions 46, 48.

There is also a recessed portion 44 formed as a substantially trapezoidal shape in plan view to a portion of the top face of the upper case 16 at the left wall thereof. The recessed portion 44 acts as an engaging portion to be engaged by a retaining member (not shown in the drawings) provided at the drive device, in order to cancel the rotational moment that accompanies movement of the door 50 in the opening direction when the opening 20 is opened.

Guide wall portions 42 extend out from the the upper case 16 and the lower case 18 respectively, with a section of the guide wall portions 42 from the vicinity of the opening 20 up the vicinity of a location of the loosely restricting wall 28 nearest to the right wall 12B (referred to below as the front half), and with a section of the guide wall portions 42 from the vicinity of the rear of the slit 40 up to the vicinity of the rear wall (referred to below as the back half). The guide wall portions 42 are of a specific height (for example about 1.0 mm to 1.5 mm) and act so as to support later described protrusions 51 of the door 50 by sandwiching the protrusions 51 from both sides, and the inside and the outside thereof.

The guide wall portions 42 are of different lengths for the upper case 16 compared to for the lower case 18, with the back half of the guide wall portions 42 on the upper case 16 side formed longer than those on the lower case 18. This is due to position control ribs (position control member) 72, which accommodates a memory board M as described later, being formed of substantially a C-shape in plan view at the rear internal wall 18B of the lower case 18, at the right wall 12B side. The rear end portions of the back half of the guide wall portions 42 are closed off in a substantially circular arc in plan view, so as to control the furthest rearward of the upper and lower protrusions 51, such that that the door 50 is not able to move any further to the rear.

The front end portions of the front half of the guide wall portions 42 is open, and extend up to a position that does not impede exit and entry of the leader pin 22 when the leader pin 22 is exiting or entering (to a position about half the width of the opening of the opening 20 further to the rear of the case 12 than the pin retaining portions 24 of the illustrated example). Guide wall portions 41 with open rear end portions are also provided projecting out in the vicinity of the angled wall portions 30, so as to be positioned on an extension of the line of the guide wall portions 42. These guide wall portions 41 do not extend further to the rear than the front end of the pin retaining portions 24, so that the rear end portions of the guide wall portions 41 do not impede exit and entry of the leader pin 22, and such that the opening 20 is closed off in the state where the front end of the door 50 intrudes into the guide wall portions 41.

The guide wall portion 41 and the guide wall portion 42 are formed so as to be slightly lower in height than the back half of the guide wall portions 42. Namely, for example, the guide wall portions 41 and the front half of the guide wall portions 42 are formed at a height of about 1 mm, and the guide wall portions 42 are formed with a height of about 1.5 mm. This enables space to be secured for pull-out means provided at the drive device to enter into the opening 20 in order to chuck onto the leader pin 22 and pull the leader pin 22 out. Consequently, as stated later, the plate width (height) of the front half portion of the door 50 (at least for the portion that closes off the opening 20) is formed so as to be bigger (taller) by at least the amount by which the guide wall portions 41 and the front half of the guide wall portions 42 are lower.

Ribs 38, of substantially trapezoidal shape in plan view, are provided at the internal face of the upper case 16 and at the internal face of the lower case 18, provided integrally to the outside guide wall portions 42 exposed from the opening 20, the height of the ribs 38 formed to be of an equivalent height to the guide wall portions 42, such that the strength of the upper case 16 and the lower case 18 secured at the opening 20 portion by provision of the ribs 38. It should be noted that the inside guide wall portions 42 are provided so as to be continuous and integral to the pin retaining portions 24, and it is preferable for the height of the pin retaining portions 24 to be formed substantially equivalent to the height of the continuous integral guide wall portions 42, or higher.

The above described upper case 16 and lower case 18 are configured so as to be fixed (joined) together by inserting non-illustrated screws from the bottom side into the screw bosses 32, 36 positioned in the vicinity of the opening 20, and into the each of the above screw bosses 60, 62, 64. The respective free ends of the angled wall portions 30 (front wall 12A) and angled wall portions 34 (right wall 12B) in particular are restrained thereby, strongly joining the corner portion at both ends of the opening 20, which is at a disadvantage in terms of strength and is susceptible to impact from being dropped on the ground etc. This produces a configuration such that there is no deformation, bucking or displacement under the weight of the recording tape cartridge 10 itself, even when the case 12 dropped.

The opening 20 is formed so as to be opened and closed by the door 50, acting as a dust blocking member. The door 50 is formed to have a plate width (height) of the portion that closes off the opening 20 substantially the same height as that of the opening 20, with the portion rearward thereof being slightly narrower (lower), and the plate length of the door 50 is formed to be sufficiently longer than the opening width of the opening 20. The door 50 is also formed in a substantially circular arced shape in plan view so as to curve around in the plate thickness direction, enabling movement along a specific circular arc.

Configuration of the door 50 is made such that the opening 20 is closed off when the leading end portion of the door 50 is in an intruded state into the guide wall portions 41, the opening 20 is opened by sliding movement (turning) of the door 50 substantially rearward along the above specific circular arc, and the opening 20 is fully opened when the outer peripheral face in the vicinity of the leading end of the door 50 reaches the vicinity of the screw bosses 36. Configuration is made such that the opening 20 is closed off by sliding movement (turning) of the door 50 in the opposite direction to the when opening the opening 20.

The door 50 is formed in this manner in a circular arc curve corresponding to the specific circular arc of the movement path thereof, and the center of turning in the present exemplary embodiment is set with a left-right direction position in the vicinity of the left edge of the case 12, and a front-rear direction position in the vicinity of the rear edge of the slit 40. The movement path of the door 50 is thereby nearest to the right wall 12B of the case 12 at the vicinity of the rear of the slit 40. It should be noted that the center of turning and the turning radius of the door 50 may be appropriately determined according to the positions of the edges at the front and rear of the opening 20 (the angled wall portions 30 and the screw bosses 36), these positions being determined by requirements of the drive device, and according to the angle of the open face of the opening 20, this being determined by requirements of the library device, etc.

The curved length dimension of the door 50 is determined so that when the opening 20 is in the closed state the position of the rear end portion of the door 50 is further back than the recessed portion 48 of the case 12, positioned in the right rear corner (in the vicinity of the recessed portion 46). The rear bottom portion of the door 50 is cut out at an angle in order to avoid a memory board M disposed at a specific angle θ within a later described position control rib 72. Preferably at least one of the internal face and/or the external of the front portion of the door 50 is formed with a tapered face so as to smoothly intrude between the guide wall portions 41.

The protrusions 51 project out from the bottom face and top face of the door 50, and respectively contact guide faces (mutually opposing inner faces) of the guide wall portions 42 and the inner faces of the upper case 16 and lower case 18 between the guide wall portions 42, thereby guiding the door 50 in the directions to open and to close the opening 20. The protrusions 51 are formed as long substantially oblong shapes when in plan view, with their length running along the length direction of the door 50. There are 4 of the protrusions 51 on each of the top face and the bottom face of the door 50, placed symmetrically up-down except for the protrusions 51 furthest to the rear, and protruding out by substantially equivalent height to the height of the guide wall portions 42 (for example, about 0.5 mm in front of the boundary of change of plate width of the door 50, and about 1.5 mm behind). It should be noted that the reason the protrusions 51 furthest to the rear are not up-down symmetrical is that the back lower portion of the door 50 is cut out at an angle.

The sliding resistance (friction) of the door 50 with the internal faces of the upper case 16 and the lower case 18 between the guide wall portions 41 and the guide wall portions 42, and with the guide faces of the guide wall portions 41 and the guide wall portions 42, can be reduced by provision of the protrusions 51, enabling smooth sliding. In addition, forming the protrusions 51 in substantially oblong shapes when in plan view gives superior shock resistance, for example than if formed in substantially circular shapes in plan view. There is therefore no danger of bending the protrusions 51, even if force is applied due to an impact from dropping or the like in a direction other than the directions to open and to close the door 50.

The operation protrusion 52 protrudes out from the outer peripheral face of the door 50 at a position slightly in front of the central portion in the length direction thereof (in the vicinity of the boundary of the change plate width of the door 50), protruding along the radial direction of the door 50. The operation protrusion 52 is provided so as to be exposed to the outside of the case 12 through the slit 40, positioned with a slight separation from the rear edge of the screw bosses 36 when the opening 20 is in a closed state, and is operable from the portion open to the front of the slit 40.

When the opening 20 is in the open state, the operation protrusion 52 is positioned with a slight separation to the rear edge of the slit 40, and in this state the rearmost protrusions 51 contact the closed-off portion at the rear of the guide wall portions 42. It should be noted that the inside and outside of the case 12 are in communication via the slit 40 used to expose the operation protrusion 52, however the slit 40 nearly always closed off by the screw bosses 36 and the door 50 along substantially the whole length inside the case 12, and there is also the loosely restricting walls 28 provided as an inner wall within the case 12. Consequently dust and the like is prevented from adhering to the recording tape T wound on the reel 14.

Stoppers 58 protrude out from the inner face of the front end of the door 50, contacting the top face and the bottom face of the leader pin 22 when the opening 20 is in the closed state, in order to be able to better prevent detachment of the leader pin 22 from the pin retaining portions 24 due to a dropping impact or the like. Since the door 50 is of a length that reaches to the right rear corner portion of the case 12 when the opening 20 is in the closed state, a coil spring 56, serving as a biasing member to bias the door 50 in the direction to close the opening 20, is disposed between the loosely restricting wall 28 and the right wall 12B (peripheral wall 16A, 18A) at the right rear corner portion, giving effective space utilization.

A plate shaped support portion 53 is provided integrally to the inner peripheral face of the door 50 in the vicinity of the rear end thereof. A spring retaining portion 54 is integrally provided protruding upwards from the top face of the support portion 53, and a circular column shaped spring anchor portion 55 projects upwards from the internal face of the lower case 18 in the vicinity of the recessed portion 48. The two ends of the coil spring 56 are formed into respective ring-shaped attachment portions 56A, 56B. The one attachment portion 56B is inserted from above over the spring anchor portion 55 and the other attachment portion 56A is inserted from above over the spring retaining portion 54, thereby enabling simple attachment of the coil spring 56 within the above described space.

A rib 57 is provided projecting out from the internal face of the upper case 16 and in sliding contact with the top edge of the spring retaining portion 54 when the door 50 is being opened or closed, the rib 57 being formed of a substantially circular arc shape in plan view. The rib 57 is provided of a length and disposed in a position such that the top end of the spring retaining portion 54 can be in sliding contact therewith at least when the door 50 initiates movement (opening), such that opening of the door 50 is better stabilized by appropriately guiding the spring retaining portion 54 as it moves against biasing force of the coil spring 56 (such that the door 50 does not judder when opening due to biasing force of the coil spring 56).

In addition, by provision of the rib 57 the attachment portion 56A of the coil spring 56 attached in the above described manner can be made so as not to detach from the spring retaining portion 54 even if the spring retaining portion 54 rises due to imparting of an impact to the case 12, such as due to dropping. The top end at the spring anchor portion 55 side is also inserted between the loosely restricting wall 28 of the upper case 16 and the guide wall portion 42, and therefore the attachment portion 56B can be prevented from detaching from the spring anchor portion 55 in a similar manner.

A memory board M is also disposed at an angle θ (for example θ=45°) in the right rear portion of the case 12, as shown in FIGS. 2 and 5 to 7, the memory board M being provided with a non-contact-accessible IC chip (not shown in the drawings) with various information, such as the recording capacity, recording format, etc. stored thereon. The memory board M is formed in a substantially rectangular flat plate shape (substantially oblong shape in plan view) with a projecting portion e formed at one face (the top face) further toward one end of the memory board M than the substantially center portion thereof in the length direction (for example toward the left hand side), the projecting portion e being of a size occupying substantially half the size of the memory board M.

The projecting portion e is formed as a protection member P to protect the IC chip, and thereby the thickness of one end in the length direction of the memory board M (in this case the left hand side half) is made thicker than the other side of the memory board M (in this case the right hand side half). The memory board M is retained by a retaining structure 70, formed at the case 12 with a length direction along the left-right direction within the case 12, such that, for example as shown in the drawings, the projecting portion e is able to be placed at the left side.

As shown in FIGS. 3 and 5 to 7, the position control rib (position control member) 72 is provided of substantially a C-shape in plan view and with a specific thickness and specific height, protruding out from the internal face of the lower case 18 at the left side of the right rear side screw boss 64, so as to accommodate the memory board M within while maintaining the memory board M orientated at the specific angle θ (without slipping or falling over), and so as to constrain the position of the memory board M in the front-rear direction and in the left-right direction (suppressing or preventing misalignment).

Namely, the position control rib 72 configuring the retaining structure 70 is formed with an opening of a specific width substantially at the center portion in the left-right direction of a case 12-rear side wall face 72B, in substantially a C-shape, as viewed from above with the right wall 12B of the case 12 at the top side. A portion of a case 12-front side wall face 72A of the position control rib 72 (to the right hand side of the substantially central portion in the left-right direction) is cut out at a specific width to leave a specific height H, with this cut-away portion being cut-out portion 74.

Figure 6:
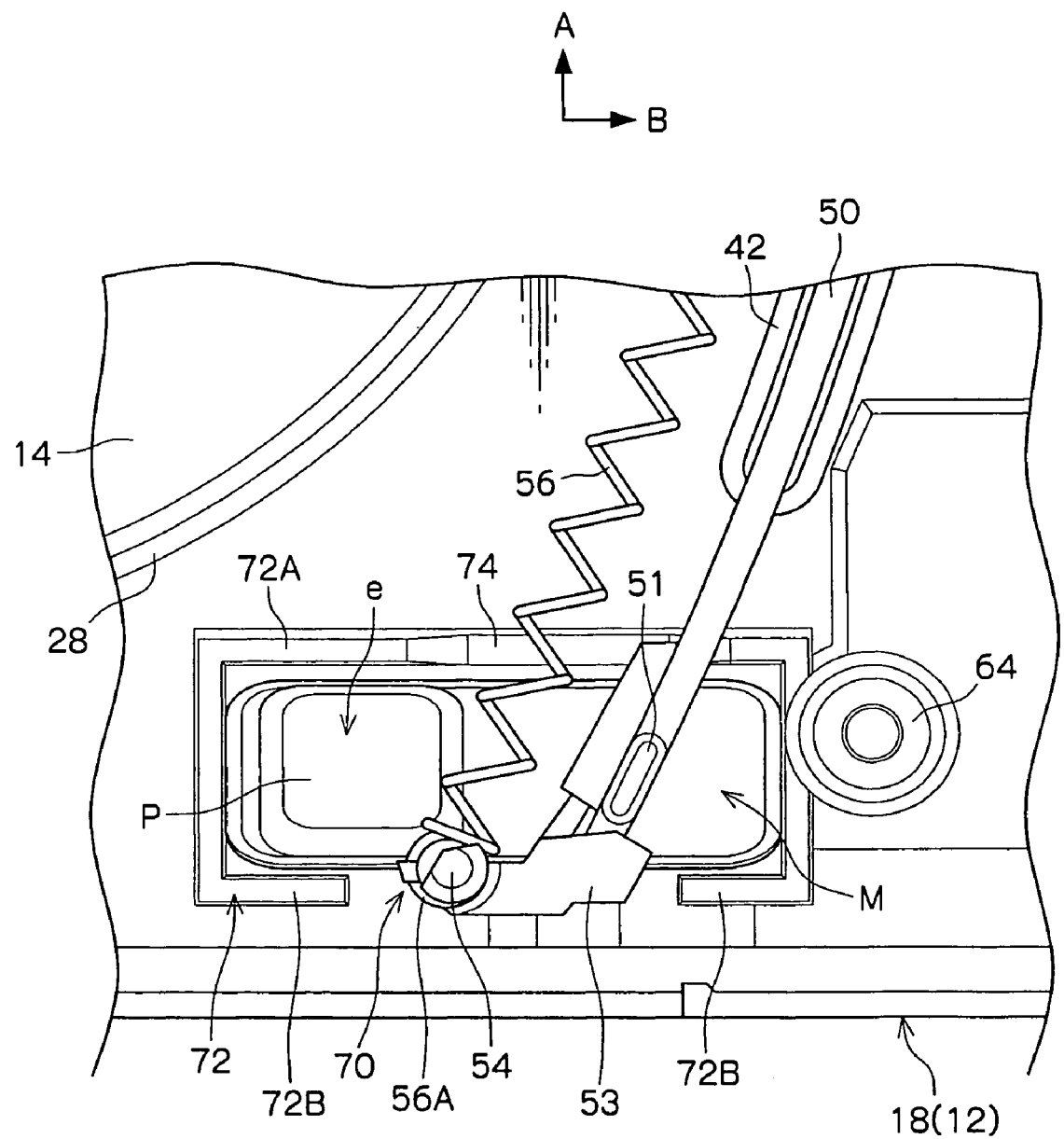
FIG. 6 is a schematic plan view showing a memory board and its retention structure when a door has been slid, with the top plate of the upper case omitted.

In this manner, as shown in FIG. 6, the substantially central portion in the left-right direction of the case 12-rear side wall face 72B of the position control rib 72 is formed as an opening, and the case 12-front side wall face 72A of the position control rib 72 is formed with the cut-out portion 74. This is done so that the cut-out portion 74 is formed of a width such that when the door 50 has been moved by sliding toward the rear of the case 12 in order to open the opening 20, the rear end portion of the door 50 does not interfere with (contact) the support portion 53, the spring retaining portion 54, and the coil spring 56, and the substantially central portion in the left-right direction of the case 12-rear side wall face 72B of the position control rib 72 is opened.

It should be noted that if the height of the case 12-front side wall face 72A of the position control rib 72 is made to be the specific height H overall, then there is no need to form the cut-out portion 74 such as the one illustrated. That is, there is a requirement for the substantially central portion in the left-right direction of the case 12-rear side wall face 72B to be open in order to avoid the rear end portion of the door 50, the support portion 53, the spring retaining portion 54 and the coil spring 56, leading to the position control rib 72 being of a C-shape in plan view. In other words the position control rib 72 is formed in a C-shape in plan view in order to avoid interference with other components within the case 12.

A plate shaped support rib (support member) 76 protrudes out from the inside face of the lower case 18 at substantially a central portion in the left-right direction the inside of the position control rib 72, the support rib 76 extending in the front-rear direction of the case 12 and being of a specific thickness and specific height. The top face of the support rib 76, configuring the position control rib 72 together with the retaining structure 70, is an angled support face 78, angled at a specific angle θ (for example angle θ=45°). Substantially the central portion in the length direction of the opposite face of the memory board M to that formed with the projecting portion e (i.e. the bottom face) is supported by the support face 78 (by the support rib 76). It should be noted that the slanting angle θ of the support face 78 is preferably made 45°, in order to give good access to the memory board M from both the bottom face and the rear face of the case 12.

Figure 4:
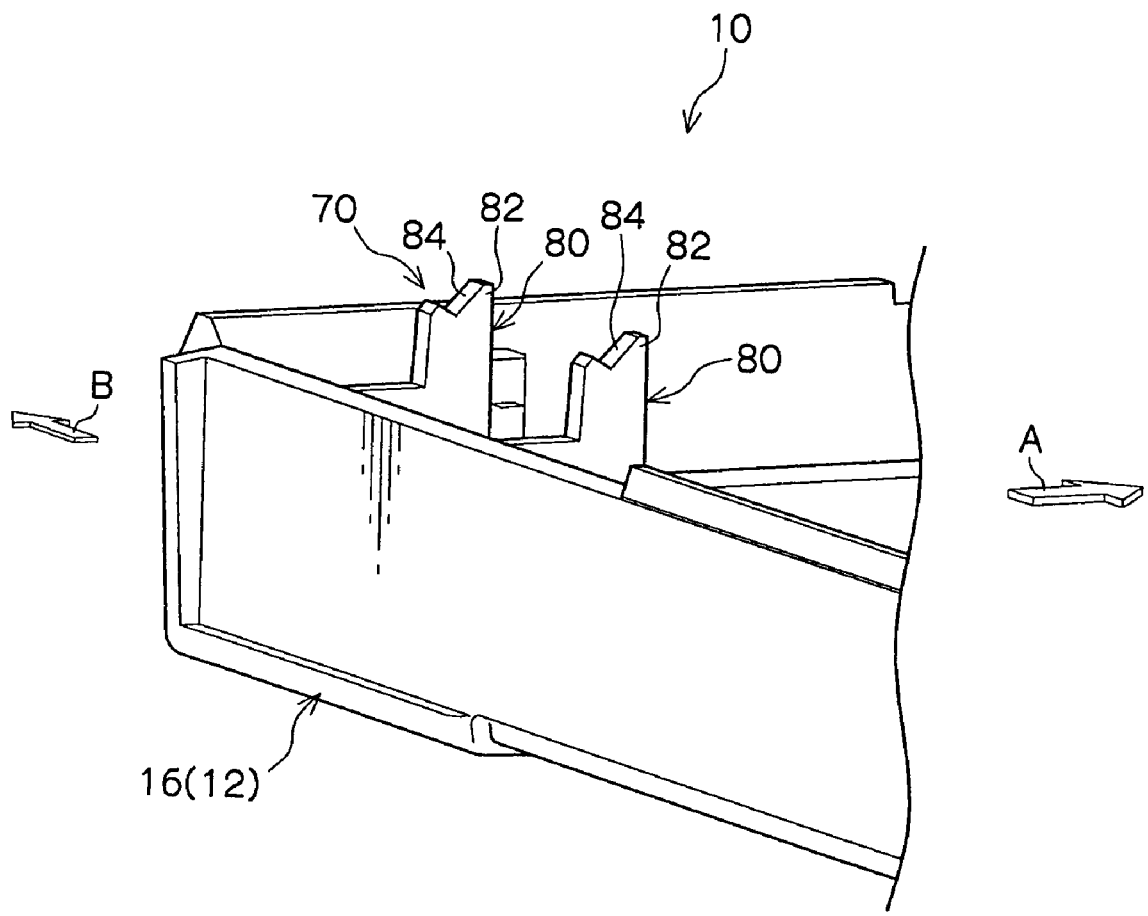
FIG. 4 is a schematic perspective view showing a memory board retention structure at an upper case side.
Figure 5:
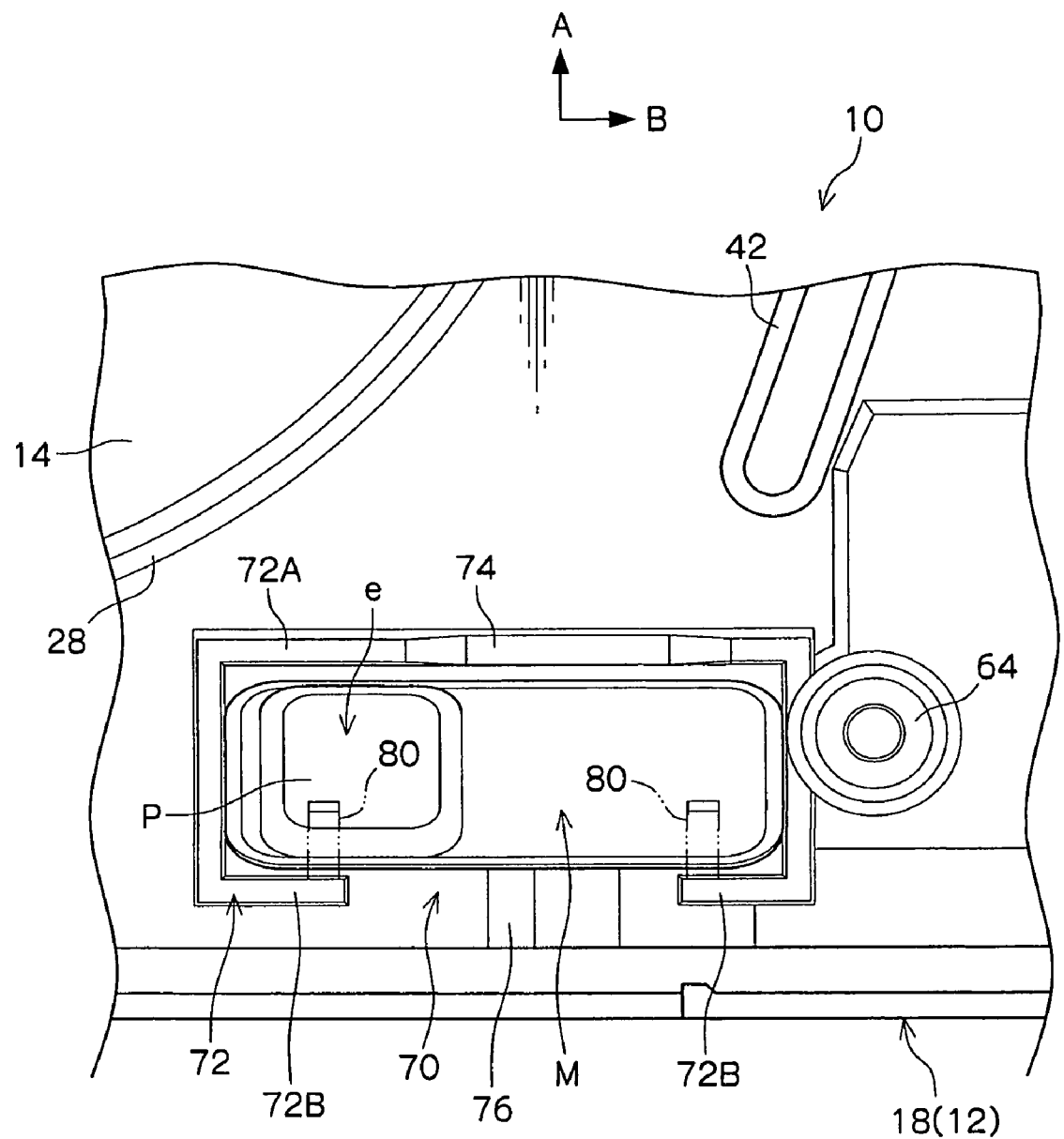
FIG. 5 is a plan view showing a memory board and its retention structure, with the top plate of the upper case omitted.
Figure 7:
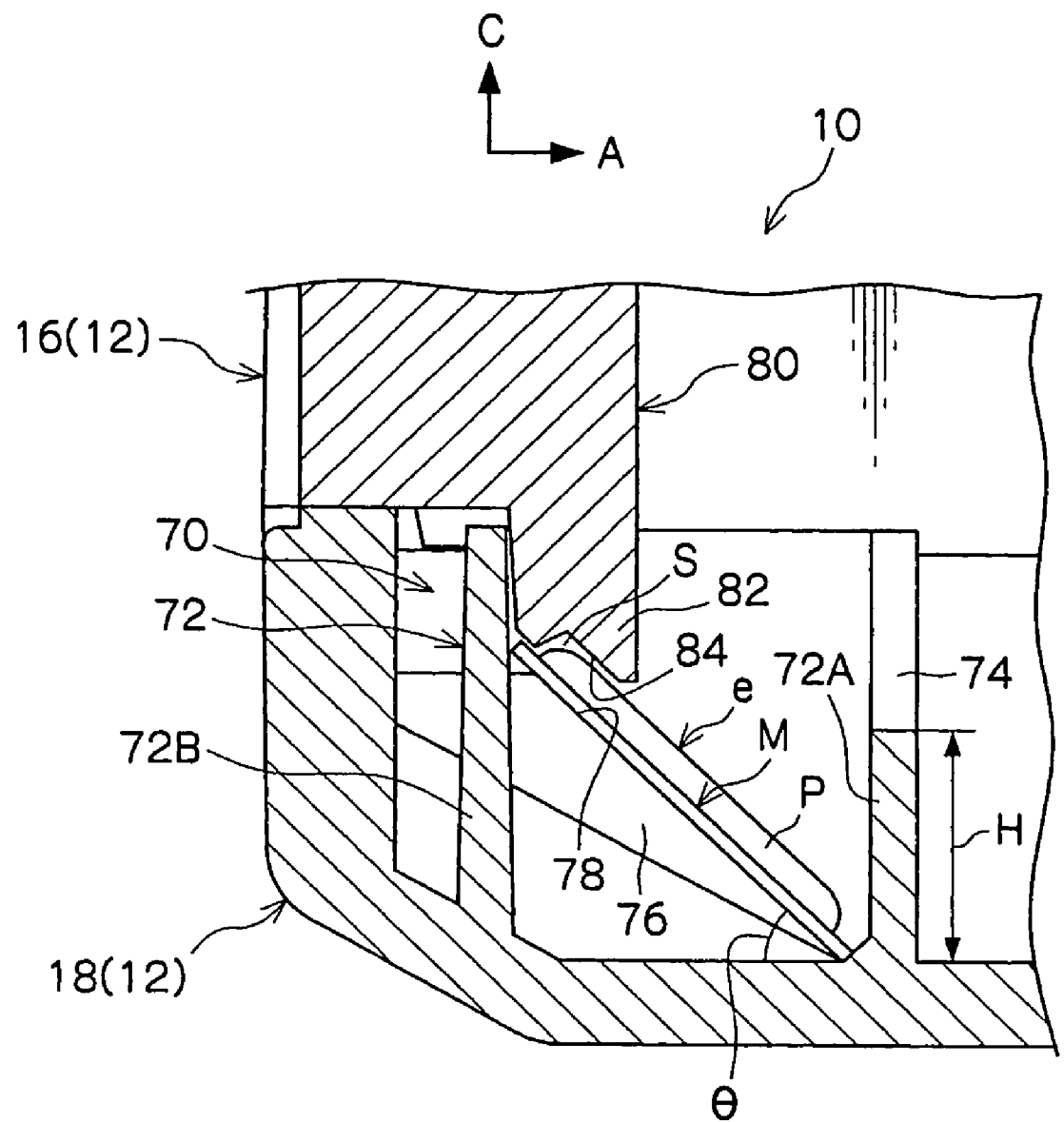
FIG. 7 is a schematic cross-section showing a memory board and its retention structure, with the top plate of the upper case omitted.

Plate shaped support ribs (support members) 80 project out from the upper case 16 further to the left than the right rear side screw boss (not shown in the drawings), extending in the front-rear direction of the case 12, as shown in FIGS. 4 and 7. The support ribs 80 are formed separated by a specific separation in the left-right direction (as a left-right pair), and are of a specific thickness and specific height. The support ribs 80, which configure the retaining structure 70 together with the position control rib 72 and the support rib 76, are formed in an L-shape in side view, and the leading end portions (bottom ends portions) 82 are formed so as to face the top face of the memory board M without contact at the vicinity of the two ends in the length direction (within 1 mm or less from the two ends of the memory board M in the length direction).

The projecting portion e is formed at one end in the length direction of the memory board M. Therefore the protruding leading end portions 82 of the support ribs 80 are cut out in substantially an inverted V-shape so that the protruding height is higher at the case 12-rear side than the protruding height at the case 12-front side, as shown in the side view of FIG. 7. In other words, the bottom face 84 of the inverted V-shape cut out in leading end portions 82 at the case 12 front side is a sloping face angled at about the same slope angle θ as the memory board M and the projecting portion e (the face sloping toward right and bottom of the side view of FIG. 7), so as to be able to face the top face of the projecting portion e with a small separation gap S to the top face thereof no matter whether the projecting portion e is on the left or the right (see FIGS. 5 and 7).

The support ribs 80 are configured in this manner so as to retain the memory board M in a directly but non-contact manner (so as to normally retain in a non-contact state when there is no warping of the memory board M or the like). The leading end portions 82 of the support ribs 80 are cut out in substantially an inverted V-shape in side view so as to be able to accommodate the projecting portion e of the memory board M (the bottom face 84 is formed so as to conform to the shape of the projecting portion e).

Explanation will now be given of the operation of the recording tape cartridge 10 configured as above. The opening 20 in the recording tape cartridge 10 configured as above is closed off by the door 50 when not in use (when being stored or transported). Specifically, the door 50 is biased in the direction to close the opening 20 by biasing force from the coil spring 56, and closes off the opening 20 in a state in which the leading end portion (the front end) of the door 50 intrudes into the guide wall portions 41 in the vicinity of the angled wall portions 30.

Plural recording tape cartridges 10 are housed in this state in the library device. A non-illustrated reading device provided with a robot hand accesses the memory board M from the rear face (back wall) side of each of the recording tape cartridges 10, reading various information stored thereon such as the recording capacity etc. and relaying this information to a control device. The most appropriate (capable of recording/reproducing each of the recording tape cartridges 10) drive device for each of the recording tape cartridges 10 is thereby identified in advance by the control device.

When the recording tape T is to be used, one of the recording tape cartridges 10 is taken out from the library device by the robot hand and this recording tape cartridge 10 is loaded into the drive device along the direction of arrow A. The drive device is a drive device selected as a result of reading out the information stored on the memory board M, and the recording tape cartridge 10 is smoothly and efficiently loaded into the drive device by the robot hand. In conjunction with loading, an opening and closing member (not shown in the drawings) of the drive device is inserted into the open slit 40 open to the front, and engages with the operation protrusion 52 of the door 50.

In this state, when the recording tape cartridge 10 (case 12) is pressed in further in the direction of arrow A, due to the pressing-in force the above opening and closing member moves the operation protrusion 52 rearward (rearward relative movement with respect to the case 12 being loaded in the direction of arrow A) against biasing force from the coil spring 56. When this occurs the door 50 turns in a clockwise direction in plan view along its curved direction, while the protrusions 51 of the door 50, from which the operation protrusion 52 is projecting, are guided by the guide wall portions 42.

Namely, due to the guide wall portions 42, the door 50 is moved along the curved shape movement path without deviating therefrom, moving substantially rearward around the outside of the pin retaining portions 24 and the reel 14, opening the opening 20. When the case 12 (the recording tape cartridge 10) is loaded to a specific depth within the drive device, the opening 20 is completely open and positioning is carried out, then a read-write device provided at the drive device accesses the memory board M from the bottom face of the recording tape cartridge 10, reads out the various information stored, and also writes separate information as required.

When positioning has as been made of the recording tape cartridge 10 within the drive device, with the opening 20 in the open state, further turning of the door 50 (movement substantially rearward) is restrained, and the pull-out member (not shown in the drawings) of the drive device enters the case 12 through the opened opening 20 and pulls out the leader pin 22 that is being retained in position by the pin retaining portions 24, and accommodates the leader pin 22 in a non-illustrated take-up reel. The recording tape T is pulled out of the case 12 as it is being wound onto the take-up reel, by synchronized rotational driving of the take-up reel and the reel 14, and recording and reproduction of information is carried out by a recording/reproduction head disposed along the specific tape path.

In order to rewind the recording tape T onto the reel 14 and eject the recording tape cartridge 10 from the drive device, the positioned state of the recording tape cartridge 10 is released, and the recording tape cartridge 10 is moved in the opposite direction to the direction of arrow A by biasing force of the coil spring 56 or by a non-illustrated ejecting mechanism. When this occurs the door 50 is rotated in the direction to close the opening 20 due to biasing force from the coil spring 56, while the protrusions 51 are being guided by the guide wall portions 42. The opening 20 is fully closed off by the leading end of the door 50 intruding into the guide wall portion 41, returning to the initial position.

Explanation will now be given of the operation of the retaining structure 70 for retaining the memory board M. The memory board M is fed into the lower case 18 side during the manufacturing processes of the recording tape cartridge 10. The lower case 18 is formed with the C-shaped position control rib 72, accommodating the memory board M therein and controlling the position of the memory board M in the front-rear direction and in the left-right direction. The lower case 18 is also formed with the support rib 76 for supporting the memory board M at substantially the central portion of the bottom face of the memory board M, and the angled support face 78 is formed at the support rib 76 at a specific angle θ (θ=45°). Consequently the memory board M is stably disposed with high precision at a specific angle θ at a specific position in the lower case 18.

The position control rib 72 is also formed in substantially a C-shape in plan view, open at substantially the central portion in the left-right direction of the case 12-rear side wall face 72B. In addition, the cut-out portion 74 of specific width is formed at the case 12-front side wall face 72A of the position control rib 72. Consequently, the rear end portion of the door 50, the support portion 53, the spring retaining portion 54, and the coil spring 56 do not impinge on the position control rib 72 (there is no contact) even when the door 50 slides to the rear direction of the case 12 so as to open the opening 20. In other words the quality of the recording tape cartridge 10 can be stabilized.

The left-right pair of support ribs 80 are also formed of a specific height to the upper case 16. After the memory board M is accommodated within the position control rib 72 of the lower case 18 and disposed at the specific angle θ, at a specific timing the upper case 16 covers the lower case 18. When this is occurring the top face of the projecting portion e of the memory board M faces one of the support ribs 80 with a specific separation gap S therebetween, and the top face of the memory board M not formed with the projecting portion e faces the other of the support ribs 80 with a specific separation gap (a gap greater than separation gap S by the thickness of the projecting portion e).

In other words the support ribs 80 directly face the memory board M in a state without contact (in a non-contact state), and retain the memory board M. Consequently there are no problems arising due to pressing of the memory board M by the support ribs 80, and no danger of deforming the memory board M. If, on the contrary, there is already warping such that the two end portions of the memory board M in the length direction warp upward at an angle, the warping of the support ribs 80 can be straightened out by the support ribs 80.

In addition, the memory board M, as described above, is formed with the projecting portion e further to one end than the substantially central portion in the length direction of the memory board M (for example at the left hand side half), and the projecting portion e is of a size occupying substantially half the size of the memory board M. However, since the substantially central portion in the length direction of the memory board M is supported by the support rib 76, if the memory board M is fed in with an orientation with respect to the lower case 18 that is left-right reversed or back-to-front in comparison with the illustrated memory board M, then there is no damage to the projecting portion e (the projecting portion e is avoided), and the memory board M can be supported.

That is to say, according to the retaining structure 70 formed in the above manner, even a memory board M formed with a projecting portion e further to one end than the substantially central portion in the length direction of the memory board M, there is no restriction to the orientation of feeding in, and stable retention of the memory board M is enabled (the position and angle of the memory board M can be stabilized, independent of the shape thereof). This consequently enables a reduction in the production line cost of the recording tape cartridge 10, and the productivity can be raised.

As explained above, with the retaining structure 70 according to the present exemplary embodiment a memory board can be stably retained without deformation thereof. In particular, even if the memory board M is constructed with a projecting portion e toward one end in the length direction, the memory board M can be retained with a stabilized position (including the angle) with high precision, independent of the orientation of the memory board M (including back-to-front).

Consequently the precision can be raised of the communication distance between the reading device of the library device accessing the memory board M from the case 12-reverse side, and the reading device of the read-write device of the drive device accessing the memory board M from the case 12-bottom side, stabilizing the electromagnetic waves transmitting and receiving to and from the reading device and the read-write device by overall stabilization of the antenna of the memory board M. The precision of reading and writing can therefore be raised, such that there is no generation of read-errors or write-errors.

The position control rib 72 is also formed in a C-shape in plan view, with at least a portion thereof open, therefore impinging against other components within the case 12 can be avoided. That is, for example, impinging of moving members (for example the door 50 etc.) on the position control rib 72 which accommodates the memory board M can be prevented, even if the recording tape cartridge 10 is configured such that moving members (for example the door 50 etc.) provided within the case 12 move by sliding up to the vicinity above the memory board M. The quality of the recording tape cartridge 10 can thereby be secured.

It should be noted that the recording tape cartridge 10 according to the present exemplary embodiment is not limited to that illustrated, and various appropriate modifications are possible without departing from the scope of the spirit of the present invention. For example, the recording tape cartridge 10 in the above exemplary embodiment is configured with the leader pin 22 serving as leader member, however configuration may be made with a non-illustrated leader tape and leader block.

In addition the door 50 is also not limited to one that slides in a substantially circular arc in plan view, and for example the door may slide in a straight line. In addition, obviously a recording tape T of any recording and reproducing format is applicable to the recording tape cartridge 10, as long as it is one that falls within the scope of an information recording-reproduction medium of long tape shape capable of recording information and reproducing the recorded information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording tape cartridge comprising:
a case for accommodating a reel on which recording tape is wound, the case comprising an upper case and a lower case which define a case wall;
a non-contact memory board, on which various information is stored and which is disposed at a specific angle within the case, wherein
the lower case comprises a position control member of substantially a C-shape in plan view for controlling the position of the memory board, the position control member being formed with an opening of a specific width at substantially a central portion in a left-right direction of the case wall, in the C-shape in plan view, and a portion of the position control member in a direction facing the opening being cut out with a specific width, and
the upper case comprises a retaining member that faces portions of the top face of the memory board at both ends in the memory board length direction;
a support member provided at the lower case for supporting the memory board at substantially the central portion of the bottom face of the memory board, wherein the support member protrudes out from an inside face of the lower case at an inside of the position control member formed in the C-shape in plan view, and a top face of the support member is slanted at a specific angle from the lower case; and
a projecting portion formed at one end side in the length direction of the memory board, and a protruding leading end portion of the retaining member is cut out in an inverted V-shape and faces the projecting portion.

2. The recording tape cartridge of claim 1, wherein the retaining member comprises a pair of the retaining members, on the left and on the right, each formed in substantially an L-shape in side view.

3. The recording tape cartridge of claim 1, wherein the memory board and the retaining member face each other with a small gap therebetween.

4. A recording tape cartridge comprising:
a case for accommodating a reel on which recording tape is wound, the case comprising an upper case and a lower case which define a case wall;
a non-contact memory board, on which various information is stored and which is disposed at a specific angle within the case;
a moving member, provided within the case and moving to the vicinity above the memory board, wherein
the lower case comprises a position control member of substantially a C-shape in plan view for controlling the position of the memory board, the position control member being formed with an opening of a specific width at substantially a central portion in a left-right direction of the case wall, in the C-shape in plan view, and a portion of the position control member in a direction facing the opening being cut out with a specific width, and
the upper case comprises a retaining member that faces portions of the top face of the memory board at both ends in the memory board length direction;
a support member provided at the lower case for supporting the memory board at substantially the central portion of the bottom face of the memory board, wherein the support member protrudes out from an inside face of the lower case at an inside of the position control member formed in the C-shape in plan view, and a top face of the support member is slanted at a specific angle from the lower case; and
a projecting portion formed at one end side in the length direction of the memory board, and a protruding leading end portion of the retaining member is cut out in an inverted V-shape and faces the projecting portion.

5. The recording tape cartridge of claim 4, wherein the retaining member comprises a pair of the retaining members, on the left and on the right, each formed in substantially an L-shape in side view.

6. The recording tape cartridge of claim 4, wherein the memory board and the retaining member face each other with a small gap therebetween.

7. The recording tape cartridge of claim 4, wherein the moving member is a door that slides to open and close an opening through which the recording tape exits and enters.

* * * * *